United States Patent
Ishimura

(10) Patent No.: US 7,839,896 B2
(45) Date of Patent: Nov. 23, 2010

(54) VIDEO TRANSMISSION SYSTEM

(75) Inventor: Isamu Ishimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 222 days.

(21) Appl. No.: 12/175,047

(22) Filed: Jul. 17, 2008

(65) Prior Publication Data

US 2009/0102974 A1 Apr. 23, 2009

(30) Foreign Application Priority Data

Oct. 19, 2007 (JP) .............................. 2007-272358

(51) Int. Cl.
- *H04H 20/28* (2008.01)
- *H04J 1/00* (2006.01)
- *H04J 3/02* (2006.01)
- *H04N 7/14* (2006.01)
- *H04N 5/91* (2006.01)

(52) U.S. Cl. ....................... 370/487; 370/490; 370/535; 370/537; 348/14.12; 386/46

(58) Field of Classification Search ......... 370/464–465, 370/468, 477, 485–490, 532–544; 348/14.12, 348/208.13, 333.11; 386/21, 46, 113, 124

See application file for complete search history.

(56) References Cited

U.S. PATENT DOCUMENTS

| | | | | |
|---|---|---|---|---|
| 5,061,999 A | * | 10/1991 | Sakashita et al. | 348/470 |
| 6,914,637 B1 | * | 7/2005 | Wolf et al. | 348/473 |
| 7,230,650 B2 | * | 6/2007 | Okamoto et al. | 348/473 |
| 7,327,381 B2 | | 2/2008 | Suzuki | |
| 7,580,612 B2 | * | 8/2009 | Sato et al. | 386/47 |
| 2002/0118762 A1 | * | 8/2002 | Shakiba et al. | 375/240.28 |
| 2004/0255329 A1 | * | 12/2004 | Compton et al. | 725/109 |
| 2006/0077778 A1 | * | 4/2006 | Tatum et al. | 369/44.11 |
| 2006/0291569 A1 | | 12/2006 | Kabuto et al. | |
| 2007/0233906 A1 | | 10/2007 | Tatum et al. | |

* cited by examiner

*Primary Examiner*—Tri H Phan
(74) *Attorney, Agent, or Firm*—McDermott Will & Emery LLP

(57) ABSTRACT

In transmission of video signals of a plurality of channels using a digital interface in conformity with the high definition multimedia interface (HDMI) standard, a transmission minimized differential signaling (TMDS) mixing circuit and a TMDS separation circuit are provided, to perform time-division transmission of TMDS data of the video signals of the plurality of channels at a frequency higher than the transmission rate of the video signals. Video signals of a plurality of channels are therefore transmitted via an inexpensive type A connector and cable.

5 Claims, 4 Drawing Sheets

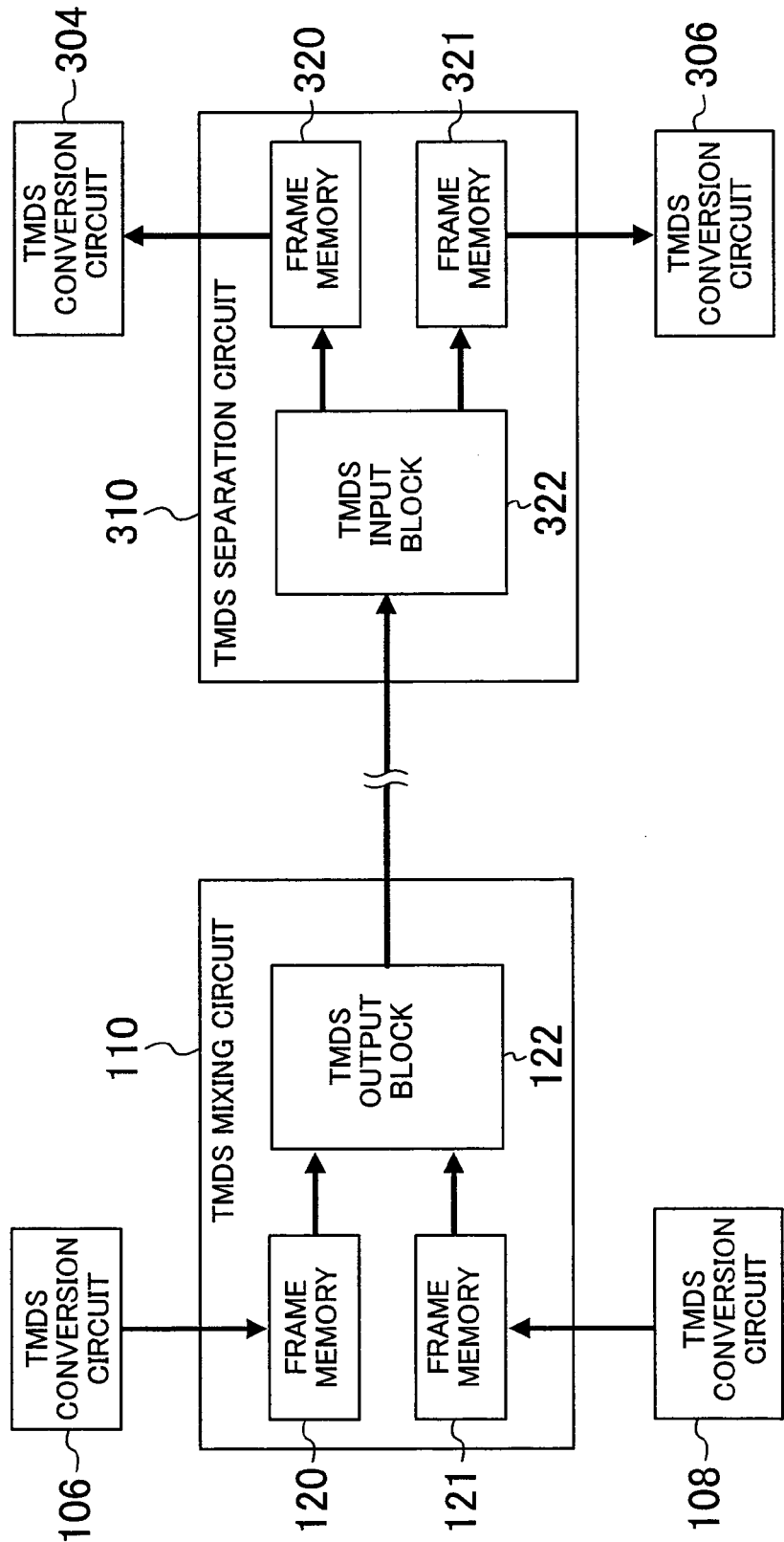

FIG.4

| Byte\Bit# | 7 | 6 | 5 | 4 | 3 | 2 | 1 | 0 |
|---|---|---|---|---|---|---|---|---|
| SB0 | 0 | 0 | 0 | Clear_AVMUTE | 0 | 0 | 0 | Set_AVMUTE |
| SB1 | PP3 | PP2 | PP1 | PP0 | CD3 | CD2 | CD1 | CD0 |
| SB2 | 0 | 0 | 0 | 0 | 0 | 0 | 0 | Default_Phase |
| SB3 | 0 | 0 | 0 | Multi_Channel_Status | Channel_Number | | | |
| SB4 | Frame_Freq | | | | Video_Freq | | | |
| SB5 | 0 | 0 | 0 | 0 | 0 | 0 | 0 | 0 |
| SB6 | 0 | 0 | 0 | 0 | 0 | 0 | 0 | 0 |

Multi_Channel_Status : "1" is set if a plurality of video signals are transmitted in one frame, or otherwise "0" is set.

Channel_Number : indicates the number of channels in one frame

Frame_Freq : indicates the pixel clock frequency of the frame transmitted

| Value | Pixel clock frequency of frame transmitted |
|---|---|
| 0 | 148.5MHz |
| 1 | 74.250MHz |
| 2 | 54.054MHz |
| 3 | 27.027MHz |
| : | : |

Video_Freq : indicate the pixel clock frequency of the video signals transmitted

| Value | Pixel clock frequency of video signal transmitted |
|---|---|
| 0 | 148.5MHz |
| 1 | 74.250MHz |
| 2 | 54.054MHz |
| 3 | 27.027MHz |
| : | : |

VIDEO TRANSMISSION SYSTEM

BACKGROUND OF THE INVENTION

1. Field of the Invention

The present invention relates to a video transmission system for sending a plurality of channels of digital video signals to a receiving apparatus such as a TV receiving set.

2. Description of Background Art

In recent years, along with the widespread use of DVDs and the start of digital TV broadcasting, equipment handling a digital video signal has become prevalent.

As an interface standard for connecting a sending apparatus (such as a DVD recorder/player and a digital AV tuner) that sends a video signal to a receiving apparatus (such as a digital TV) that receives the video signal, high definition multimedia interface (HDMI) is available. The HDMI standard, which stipulates interface specifications for transmitting a baseband digital video signal to a receiving apparatus, assumes its incorporation into consumer equipment with its compatibility with digital visual interface (DVI) widely adopted in personal computers being kept. One HDMI cable connecting a sending apparatus to a receiving apparatus permits transmission of baseband (uncompressed) video data and audio data.

Many of recent display apparatuses such as digital TVs are provided with a function such as the picture-in-picture function to permit simultaneous display of two or more screens, and the use range thereof is wide. The HDMI standard however basically allows transmission of only one channel of video data. If simultaneous transmission of two channels of video data is desired, two signal processing routes must be provided using two HDMI cables. In this case, in which two pairs of HDMI cables and HDMI connectors must be prepared, a system with very high cost will result.

The HDMI standard actually supports a method for achieving 2-channel simultaneous transmission using one cable. For this achievement, however, a type B HDMI connector is required, which has a sufficient number of terminals to transmit two channels of transmission minimized differential signaling (TMDS) differential signals.

The HDMI connectors and HDMI cables presently widespread in the market are of type A having only the number of terminals with which one channel of TMDS differential signal can be transmitted. The occupation of type A in the market may well be 100% without exaggeration. Type B HDMI connectors and HDMI cables permitting 2-channel simultaneous transmission are close to non-existent in the market and expected to be very expensive if appearing on the market.

There is also known a technique in which a compressed video signal of one channel is packetized during a blanking interval of an uncompressed video signal of another channel, and these video signals are multiplexed, to thereby achieve simultaneous transmission of two channels of video signals (see US 2006/0291569 A1).

SUMMARY OF THE INVENTION

The conventional techniques described above have the following problems. It is unrealistic to use type B HDMI connectors and HDMI cables that are not prevalent in the market. Also, transmission of more than two channels is unavailable.

In the technique of packetizing a compressed video signal of one channel during a blanking interval of an uncompressed video signal of another channel and multiplexing these video signals, a system must be additionally equipped with video compression/decompression circuits if not being equipped with such circuits, and this increases the cost. Moreover, transmission of more than two channels is difficult due to the limitation of the blanking interval.

To solve the above problems, the present invention is directed to a video transmission system provided with a digital interface performing baseband transmission like HDMI, including a video sending apparatus and a video receiving apparatus to follow, wherein a plurality of video signals are transmitted using a pixel clock frequency higher in resolution than the resolution of the video signals transmitted. The video sending apparatus includes TMDS conversion circuits provided for respective units of processing of video signals to be sent and a TMDS mixing circuit for time-multiplexing TMDS signals outputted from the TMDS conversion circuits. The video receiving apparatus includes a TMDS separation circuit for demultiplexing a TMDS signal including a plurality of TMDS signals time-multiplexed by the TMDS mixing circuit and TMDS conversion circuits for converting the demultiplexed TMDS signals to video signals.

According to the present invention, video signals of a plurality of channels are transmitted simultaneously from a video sending apparatus such as a DVD recorder, to enable simultaneous display of a plurality of screens in a video receiving apparatus such as a digital TV. Moreover, an inexpensive type A HDMI connector and cable high in prevalence can be used to attain simultaneous transmission of video signals of a plurality of channels.

BRIEF DESCRIPTION OF THE DRAWINGS

FIG. 3 is a block diagram of TMDS mixing/separation circuits in FIG. 1.

FIG. 4 is an exemplary format for a multi-channel transmission notification packet.

DESCRIPTION OF THE PREFERRED EMBODIMENTS

Hereinafter, an embodiment of the present invention will be described in detail with reference to the accompanying drawings. Note that the description to follow should by no means be construed to restrict the technical range of the present invention.

Figure 1:
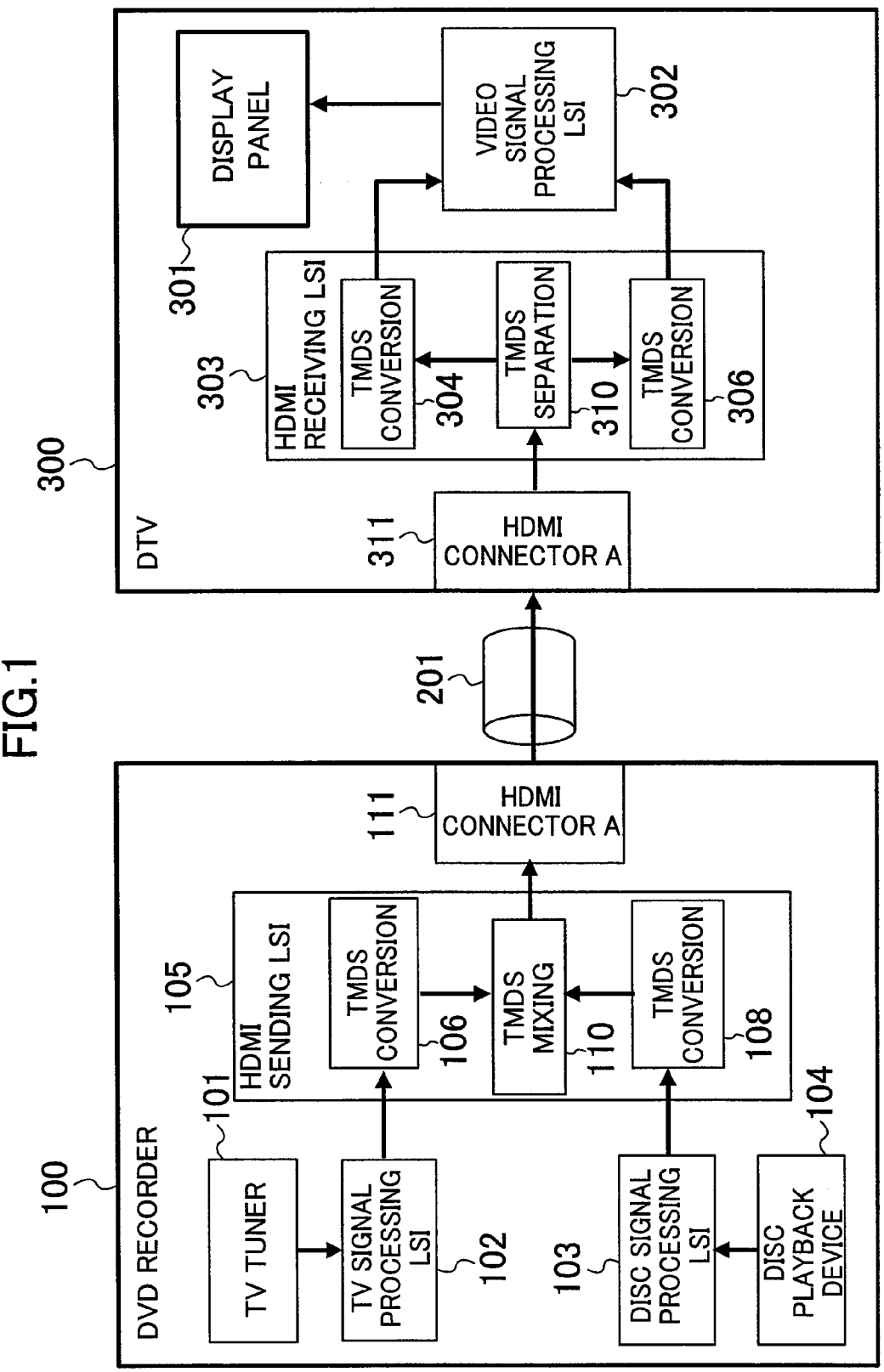
FIG. 1 is a block diagram of a video transmission system of the present invention.

FIG. 1 is a block diagram of a video transmission system of the present invention. The video transmission system of FIG. 1 is a system including a video sending apparatus (DVD recorder) 100 and a video receiving apparatus (digital TV (DTV)) 300 connected to each other via a type A HDMI cable 201, in which to attain 2-screen simultaneous display on a display panel 301, two channels of video data are converted to a TMDS differential signal having a double frequency to allow transmission with only the number of TMDS transmission terminals for one channel.

The video sending apparatus 100 includes: a TV tuner 101 for receiving a broadcast wave; a TV signal processing LSI 102 responsible for decompression and the like of a compressed video signal received by the TV tuner 101; a disc playback device 104 for playing back a disc such as a DVD, a HDD and a BD; a disc signal processing LSI 103 responsible for decompression and the like of a compressed video signal played back by the disc playback device 104; a HDMI sending LSI 105; and a type A HDMI connector 111. The HDMI sending LSI 105 includes: a TMDS conversion circuit 106 for converting an uncompressed video signal outputted from the TV signal processing LSI 102, combined with an audio signal and added information, to a TMDS differential signal; a TMDS conversion circuit 108 for converting an uncompressed video signal outputted from the disc signal processing LSI 103, combined with an audio signal and added information, to a TMDS differential signal; and a TMDS mixing circuit 110 for mixing the TMDS differential signals outputted from the TMDS conversion circuits 106 and 108 into a TMDS differential signal higher in frequency than that of the respective original TMDS differential signals.

The video receiving apparatus 300 includes: a type A HDMI connector 311; a HDMI receiving LSI 303; a video signal processing LSI 302 responsible for selection/mixing of two video signals, scale adjustment to the display panel size and the like; and the display panel 301. The HDMI receiving LSI 303 includes: a TMDS separation circuit 310 for separating the TMDS differential signals mixed by the TMDS mixing circuit 110 to obtain the TMDS differential signals having the frequency of the original video signals; and TMDS conversion circuits 304 and 306 for converting the TMDS differential signals to video signals.

Figure 2:
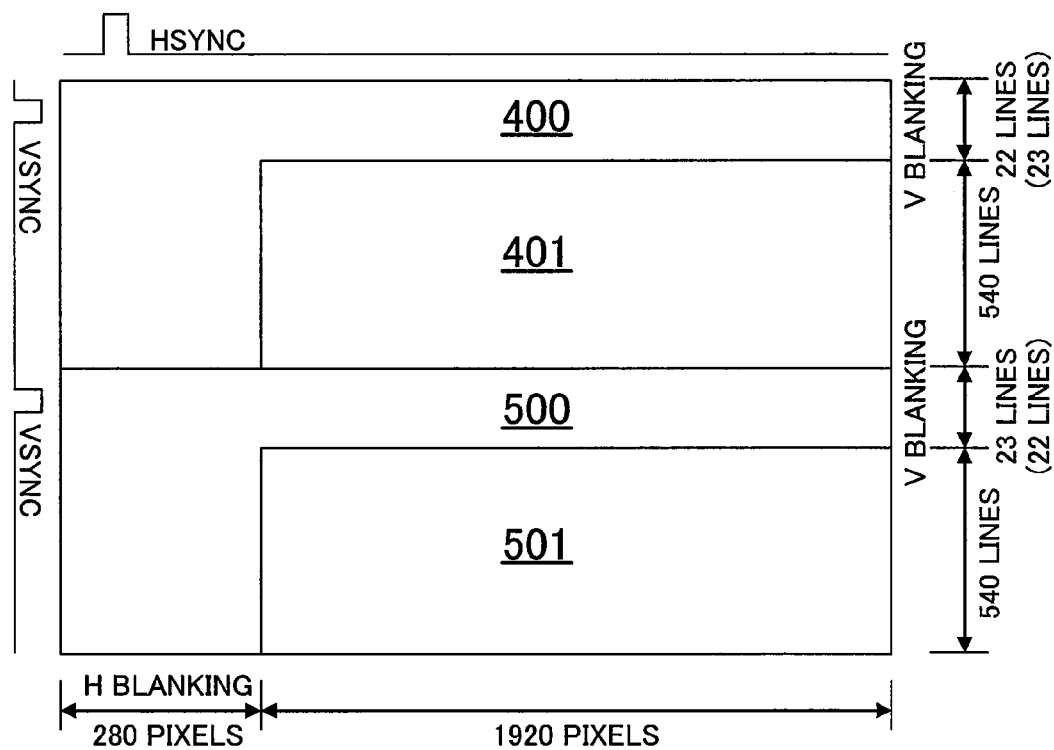
FIG. 2 is an exemplary transmission format (1080i/60 Hz) of two channels of video signals according to the present invention.

FIG. 2 shows a video signal transmission format of a TMDS differential signal in the case of 2-channel simultaneous transmission of a 1080i/60 Hz video format according to the present invention, as an example. Basically, frames of two channels are incorporated in one frame of transmission data, and using a data transmission frequency of 148.5 MHz for 1080p/60 Hz, 1080i/60 Hz transmission data (data amount transmissible at 74.25 MHz, a half data transmission frequency of that for 1080p/60 Hz) of two channels is transmitted. Note that all the frequency values are herein represented by frequency values before TMDS conversion for the sake of convenience although after TMDS conversion, the frequency value becomes ten times as large as that before TMDS conversion. A blanking signal 400 and a video signal 401 of one 1080i video signal channel are transmitted in the former half of one frame, and a blanking signal 500 and a video signal 501 of the other 1080i video signal channel are transmitted in the latter half of the frame. As another example, in the case of multi-channel transmission of a 480p/60 Hz video signal (data transmission frequency: 27.027 MHz) using the data transmission frequency for 1080p/60 Hz (148.5 MHz), video signals of five channels will be able to be transmitted. The HDMI standard, which defines up to 1080p/60 Hz deep color 16-bit transmission, permits use of up to 297 MHz that is the data transmission frequency in this case.

FIG. 3 shows in detail the TMDS mixing circuit 110 and the TMDS separation circuit 310 that are a key factor of the present invention. The TMDS mixing circuit 110 includes: a frame memory 120 capable of storing at least one frame of the video signal received from the TMDS conversion circuit 106; a frame memory 121 capable of storing at least one frame of the video signal received from the TMDS conversion circuit 108; and a TMDS output block 122 for reading the TMDS signals from the two frame memories frame by frame alternately and outputting the read signal to the connector side. To state specifically using the example shown in FIG. 2, the frame memories 120 and 121 respectively receive TMDS data from the TMDS conversion circuits 106 and 108 at the transmission rate of 74.25 MHz. The TMDS output block 122 reads the TMDS data from the frame memory 120 at the transmission rate of 148.5 MHz and at the same time outputs the data to the connector side. Once finishing reading one frame of data from the frame memory 120, the TMDS output block 122 then reads the TMDS data from the frame memory 121 similarly at the transmission rate of 148.5 MHz and at the same time outputs the data to the connector side.

The TMDS separation circuit 310 includes: a TMDS input block 322 for writing the TMDS signals received from the connector side into two frame memories frame by frame alternately; a frame memory 320 capable of storing at least one frame of a video signal received from the TMDS input block 322; a frame memory 321 capable of storing at least one frame of another video signal received from the TMDS input block 322. To state specifically using the example shown in FIG. 2, once receiving the TMDS data including video signals of two channels (transmission rate: 148.5 MHz) from the connector side, the TMDS input block 322 detects the head data of a frame and writes one frame of data to the frame memory 320. Subsequently, the TMDS input block 322 writes the next frame of data to the frame memory 321. The TMDS conversion circuits 304 and 306 respectively read the TMDS data from the frame memories 320 and 321 at the transmission rate of 74.25 MHz.

Simultaneous transmission of video data of more than two channels can be attained by providing a plurality of TMDS conversion circuits and frame memories to increase the input/output routes to/from the TMDS output block and the TMDS input block.

In this embodiment, exemplified was the time division multiplexing of a video signal per frame. In this case, however, there is a concern that the cost may arise with increase in the size of the frame memories. In view of this, time division multiplexing per line, not per frame, may be adopted. In this case, since a memory size permitting storage of only at least one line is enough, an inexpensive apparatus can be obtained.

Next, referring to FIG. 4, described will be an example of how the video sending apparatus 100 notifies the video receiving apparatus 300 of a transmission format in transmission of a plurality of video signals. FIG. 4 shows a configuration of a general control packet (GCP) defined in the HDMI standard. The HDMI standard originally defines to fill in all the hatched fields in FIG. 4 with "0". The notification of the transmission format is made using these fields.

Multi_Channel_Status indicates whether or not a plurality of video signals are to be transmitted in one frame of TMDS data, in which "1" represents that a plurality of video signals are included and "0" represents that only one video signal is to be transmitted. Channel_Number indicates the number of video signals included in the case of including a plurality of video signals. Frame_Freq indicates the transmission rate of TMDS data (the transmission frequency values before TMDS conversion are shown in the table presented in the remarks for Frame_Freq in FIG. 4). Video_Freq indicates the transmission frequency of original video data transmitted. In the example shown in FIG. 2, Frame_Freq=0 and Video_Freq=1. The fields Channel_Number, Frame_Freq and Video_Freq are valid only when Multi_Channel_Status=1.

It is needless to mention that the way of notification shown in FIG. 4 is merely illustrative and any other way of notification may be adopted.

As described above, the TMDS mixing circuit 110 and the TMDS separation circuit 310 are provided, to mix each one frame of a plurality of video signals together as one frame of TMDS data and transmit the mixed data at a transmission rate higher than the transmission rate of the video signals transmitted. In this way, a plurality of video signals can be transmitted simultaneously.

As described above, the video transmission system of the present invention is a very useful system permitting inexpensive simultaneous transmission of video signals of a plurality of channels from the video sending apparatus to the video receiving apparatus.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A video transmission system provided with a digital interface performing baseband transmission, comprising:
    a video sending apparatus comprising transmission minimized differential signaling (TMDS) conversion circuits provided for respective units of processing of video signals to be sent and a TMDS mixing circuit for time-multiplexing TMDS signals outputted from the TMDS conversion circuits; and
    a video receiving apparatus comprising a TMDS separation circuit for demultiplexing a TMDS signal including a plurality of TMDS signals time-multiplexed by the TMDS mixing circuit and TMDS conversion circuits for converting the demultiplexed TMDS signals to video signals,
    wherein a plurality of video signals are transmitted using a pixel clock frequency higher in resolution than the resolution of the video signals transmitted, and
    the TMDS mixing circuit time-multiplexes TMDS signals of a plurality of images frame by frame, to provide the TMDS signals as one frame higher in resolution than the resolution of the video signals.

2. The video transmission system of claim 1, wherein the TMDS separation circuit detects frame head information from the TMDS signal including a plurality of TMDS signals time-multiplexed by the TMDS mixing circuit and demultiplexes the multiplexed TMDS signal frame by frame.

3. A video transmission system provided with a digital interface performing baseband transmission, comprising:
    a video sending apparatus comprising transmission minimized differential signaling (TMDS) conversion circuits provided for respective units of processing of video signals to be sent and a TMDS mixing circuit for time-multiplexing TMDS signals outputted from the TMDS conversion circuits; and
    a video receiving apparatus comprising a TMDS separation circuit for demultiplexing a TMDS signal including a plurality of TMDS signals time-multiplexed by the TMDS mixing circuit and TMDS conversion circuits for converting the demultiplexed TMDS signals to video signals,
    wherein a plurality of video signals are transmitted using a pixel clock frequency higher in resolution than the resolution of the video signals transmitted,
    the TMDS mixing circuit time-multiplexes TMDS signals of a plurality of images line by line, to provide the TMDS signals as one frame higher in resolution than the resolution of the video signals, and
    the TMDS separation circuit detects frame head information from the TMDS signal including a plurality of TMDS signals time-multiplexed by the TMDS mixing circuit and demultiplexes the multiplexed TMDS signal line by line.

4. A video sending apparatus connected to a digital interface performing baseband transmission, comprising:
    transmission minimized differential signaling (TMDS) conversion circuits provided for respective units of processing of video signals to be sent; and
    a TMDS mixing circuit for time-multiplexing TMDS signals outputted from the TMDS conversion circuits,
    wherein a plurality of video signals are sent using a pixel clock frequency higher in resolution than the resolution of the video signals inputted in the TMDS conversion circuits, and
    the TMDS mixing circuit time-multiplexes TMDS signals of a plurality of images frame by frame, to provide the TMDS signals as one frame higher in resolution than the resolution of the video signals.

5. A video receiving apparatus connected to a digital interface performing baseband transmission, comprising:
    a transmission minimized differential signaling (TMDS) separation circuit for demultiplexing a TMDS signal including a plurality of TMDS signals time-multiplexed; and
    TMDS conversion circuits for converting the demultiplexed TMDS signals to video signals,
    wherein a plurality of video signals are received using a pixel clock frequency higher in resolution than the resolution of the video signals outputted by the TMDS conversion circuits, and
    the TMDS separation circuit detects frame head information from the TMDS signal including a plurality of TMDS signals time-multiplexed and demultiplexes the multiplexed TMDS signal frame by frame.

* * * * *